United States Patent

Hoshino et al.

[11] Patent Number: 5,936,220
[45] Date of Patent: Aug. 10, 1999

[54] ELECTRONIC WALLET AND METHOD OF OPERATION OF THE SAME

[75] Inventors: Takeshi Hoshino, Kodaira; Jun Furuya; Koji Suso, both of Kokubunji; Masaki Takano, Musashino; Hiroki Kitagawa, Tokyo, all of Japan

[73] Assignee: Hitachi, Ltd., Tokyo, Japan

[21] Appl. No.: 08/804,544

[22] Filed: Feb. 24, 1997

[30] Foreign Application Priority Data

Feb. 29, 1996 [JP] Japan ..................................... 8-042800

[51] Int. Cl.⁶ ............................. G06K 5/00; G06K 19/06
[52] U.S. Cl. ........................................... 235/380; 235/492
[58] Field of Search .................... 235/375, 379, 235/381, 380, 382, 486, 492

[56] References Cited

U.S. PATENT DOCUMENTS

| | | | |
|---|---|---|---|
| 4,341,951 | 7/1982 | Benton | 235/379 |
| 4,980,910 | 12/1990 | Oba et al. | 379/355 |
| 5,015,830 | 5/1991 | Matsuzawa et al. | 235/441 |
| 5,221,838 | 6/1993 | Gutman et al. | 235/379 |

FOREIGN PATENT DOCUMENTS

| | | | |
|---|---|---|---|
| 0105381 | 6/1983 | Japan | 235/486 |
| 7-203053 | 1/1996 | Japan . | |
| 8-115389 | 5/1996 | Japan . | |
| 8-180154 | 7/1996 | Japan . | |

*Primary Examiner*—Thien Minh Le
*Attorney, Agent, or Firm*—Fay,Sharpe,Beall,Fagan,Minnich & McKee

[57] ABSTRACT

A compact electronic wallet, which is intended for easy operation based on a reduced number of keys, has an LCD display window, only keys including a cross key used for the entry of password number and amount of money transfer, Function key and Enter key on the top of the casing, and two IC card slots on the upper and lower sides of the casing. The user's own IC card is put into the lower card slot, which is normally closed by a hinged card cover, and held inside the casing, while other IC card is put into the upper card slot for electronic money transfer. Power is turned on in response to the operation of any key and turned off on expiration of a certain time after the last key operation.

20 Claims, 11 Drawing Sheets

PROCEDURE OF MONEY TRANSFER

ELECTRONIC WALLET AND METHOD OF OPERATION OF THE SAME

BACKGROUND OF THE INVENTION

The present invention relates to an electronic wall which holds an IC card used for the electronic money transaction system, and particularly to an electronic wallet which is useful for small amount payment by means of an IC card which stores electronic money.

In recent years, there has been proposed an electronic money transaction system for transferring electronic money based on the communication between IC cards which can store electronic money. The IC card used in this system incorporates a microprocessor having a communication function and a memory, e.g., EEPROM, for storing a processing program and the balance of electronic money. The IC card can be used for electronic money transaction with other IC cards through the electronic money transaction system which includes terminals installed in banks, retail stores, individual residences, etc. linked by the public telephone line, or by use of dedicated terminals.

In regard to the prior art electronic money transaction system, Japanese patent publication JP-A-Hei-8-115389 discloses an electronic wallet system, and Japanese patent publication JP-A-Hei-8-180154 discloses an electronic wallet apparatus. The electronic wallet system described in the former publication is capable of turning the IC card to the locked state automatically for the sake of enhanced security when it is pulled out of the IC card reader/writer, and unlocking the IC card automatically when it is put into the IC card reader/writer for the sake of the enhanced operability. The electronic wallet apparatus described in the latter publication has the provision of IC card protection for an IC card handling POS system for example, in which an illegality code is generated and recorded automatically in an IC card having a transaction record of a retail store or the like when it is pulled out of the register as illegal conduction, thereby provided the apparatus with the enhanced security and operability.

The above-mentioned electronic money transaction system is still at the stage of development, with its constituent devices being left indeterminate for their functions and configurations.

The electronic wallet carried by the user, with an IC card being held in it for the transaction of electronic money through the electronic money transaction system, is required to have such functions as reading out the balance of electronic money in IC cards and transferring electronic money between two pieces of IC cards. The user of IC card of electronic money is obliged to key-in many numeric characters with the ten-key set while viewing displayed characters in the display window for the entry of an amount of electronic money based on these functions (see U.S. patent application Ser. No. 08/690966).

Accordingly, it is an object of the present invention to provide an electronic wallet which is carried by the user, with an IC card which can store electronic money that is current in the electronic money transaction system being held in it.

Another object of the invention is to provide an electronic wallet and a method of operation of the same capable of having a reduced number of operation keys and reduced operation board area without sacrificing the operability while having a large display window area, thereby enabling the user to enter and view an amount of money and the like easily.

SUMMARY OF THE INVENTION

The above-mentioned objects are achieved by the electronic wallet having an operation board and display window, with an IC card of electronic money being held in it, wherein the operation board includes a key set having four acting positions, e.g., a cross key, for specifying four operational functions. The operation board may include Function key and Enter key in addition to the cross key which is used for the entry of numerals. The cross key, which is generally a single key having four acting positions in cross configuration, includes here a set of four independent keys in united arrangement having four acting positions for specifying four operational functions as shown in FIGS. 13A, 13B and 13C, or it may be a joystick device which specifies operational functions depending on the tilt direction.

The above-mentioned objects are achieved based on the use of the cross key with its keys of four acting positions assigned to the functions of additive input and subtractive input of unit amounts of money, or assigned to the functions of additive input of unit amounts of money and the function of input cancellation, or assigned to the functions of additive input of unit amounts of money, the function of input cancellation and the function of Enter key, or assigned to the functions of additive input of unit amounts of money, the functions of Enter key and Function key.

The above-mentioned objects are achieved based on the power on/off scheme in which power is turned on when any key on the operation board is operated and power is turned off on expiration of a prescribed time length after the last key operation on the operation board.

The above-mentioned objects are achieved based on the structure in which keys on the operation board have their key tops recessed below the top surface, where the operation board is formed, of the casing of the electronic wallet, or the electronic wallet has a top cover hinged to the casing and adapted to cover the operation board and display window, or the electronic wallet has a transparent top cover which is adapted to cover the operation board and slide on the casing toward the display window.

In order to achieve the above-mentioned objects, the invention resides in a method of operation of an electronic wallet which has a room for holding one IC card which can store electronic money, a card inlet for putting in other IC card which can store electronic money, an operation board including a cross key consisting of four keys in united arrangement with four acting positions which can specify four operational functions, Function key and Enter key, and a display window, and is used for the transaction of electronic money with the one IC card and the transfer of electronic money between the one IC card and the other IC card, the method including function selecting operations carried out after power is turned on and in a home-position state in which an icon indicative of balance display mode and icon indicative of locked state and the balance of electronic money of the one IC card are displayed in the display window, and comprising: a first step of pushing the Function key thereby to display the balance of electronic money of the other IC card in the display window if the other IC card is present in the card inlet, or bring the electronic wallet to lock operation mode for the one IC card, with an icon of lock operation mode being turned on, if the other IC card is absent in the card inlet; a second step of pushing the Function key thereby to bring the electronic wallet to lock operation mode for the other IC card, with the icon of lock operation mode being turned on, if the other IC card is present in the card inlet, or restore the home-position state of the electronic wallet if the other IC card is absent in the card inlet; a third step of pushing the Function key in the lock operation mode established by the second step thereby to bring the electronic wallet to transfer mode of transferring electronic money from the one IC card to the other IC card, with an icon of the money transfer being turned on; and a fourth step of pushing the Function key thereby to bring the electronic wallet to transfer mode of transferring electronic money from the other IC card to the one IC card, with an icon of the money transfer being turned on.

These and other objects and features of the present invention will become more apparent from the following description of embodiments taken in conjunction with the accompanying drawings.

DESCRIPTION OF THE PREFERRED EMBODIMENTS

Figure 1:
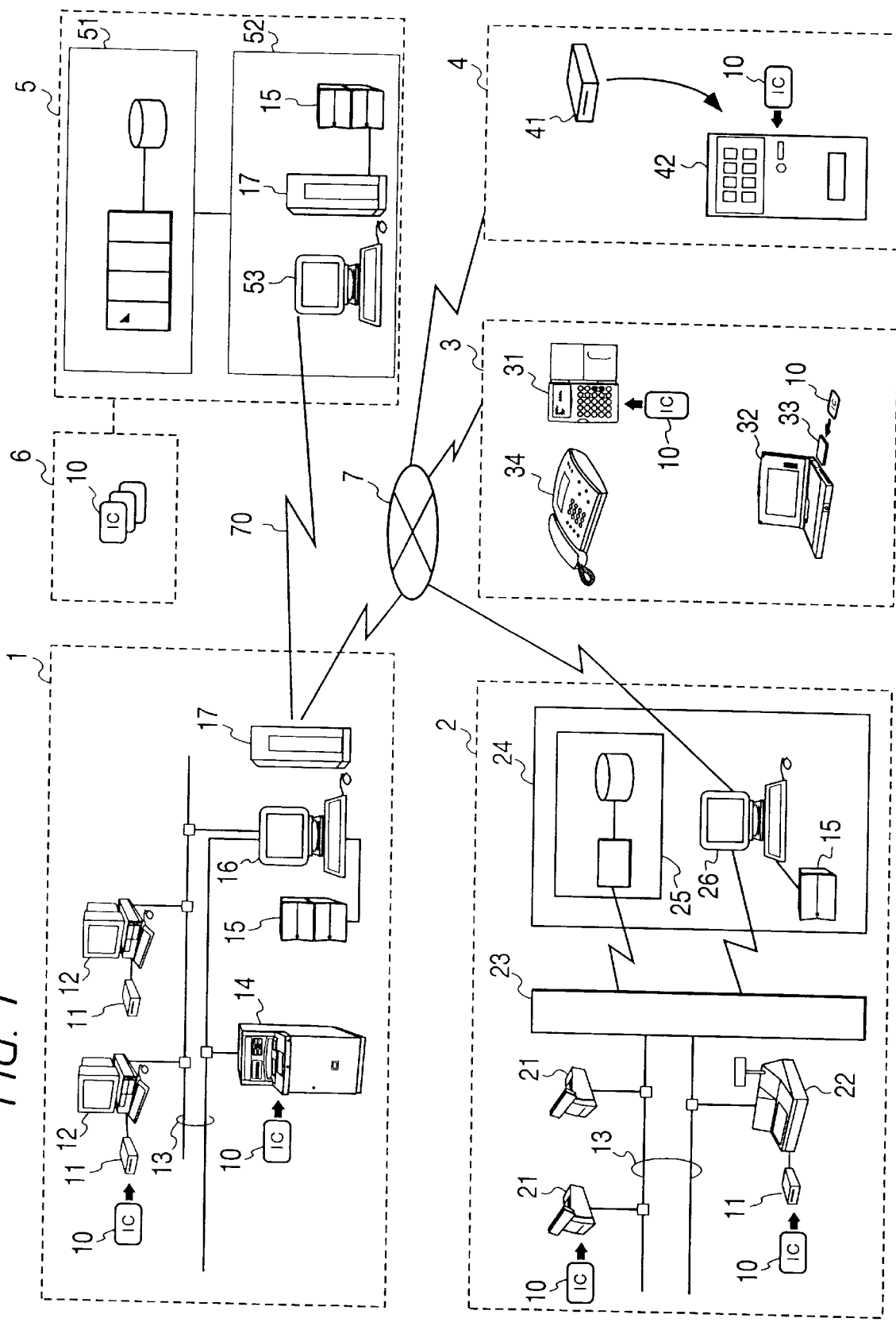
FIG. 1 is a block diagram of the electronic money transaction system, with the inventive electronic wallet being applied thereto.

The electronic wallet used for the electronic money transaction system based on an embodiment of this invention will be explained with reference to the drawings.

The electronic money transaction system will first be explained with reference to FIG. 1. In the figure, reference numeral 1 denotes a bank branch system, 2 is a retail store system, 3 is an individual user system, 4 is a vending machine system, 5 is a bank computing center, 6 is an electronic money originator, 7 is a public telephone line, 10 is an IC card, 11 is an attached IC card reader/writer unit, 12 is a banking teller terminal, 13 is an internal communication line, 14 is an auto-teller machine (ATM), 15 is a value box, 16 is an electronic money transaction management terminal, 17 is a relay computer, 21 is an electronic money POS terminal, 22 is a usual POS terminal, 23 is a store controller, 24 is a center facility, 25 is a value control/management system, 26 is a workstation, 31 is an electronic wallet, 32 is a personal computer, 33 is a PC-attached card reader/writer, 34 is an IC card telephone, 41 is a built-in IC card reader/writer, 42 is a vending machine, 51 is a host accounting system, 52 is an external accounting system, and 53 is an external management terminal.

The electronic money transaction system shown in FIG. 1 is made up of a bank branch system 1, retail store system 2 installed in a large retail dealer such as a department store or supermarket, individual user system 3 including a personal computer 32 and IC card telephone 34 all linked through a public telephone line 7, and a vending machine system 4 which is not linked to the telephone line 7. Although shown in FIG. 1 are one set of several kinds of systems, it is possible to organize a plurality of these systems linked through the public telephone line 7. The bank branch system 1 also has a direct connection through a leased line to a bank computing center 5, which is connected to an electronic money originator 6.

IC cards 10, each including a microprocessor with a communication function and a memory, e.g., EEPROM, for storing a processing program and the balance of electronic money, are possessed by individual users, banks, retail stores, vending machines, etc. that are members of the electronic money transaction system.

The bank branch system 1, which already has the connection with an existing banking teller terminals 12 and auto-teller machine 14 through an internal communication line 13, is further connected with the bank computing center 5 by way of a relay computer 17. For carrying out the monetary settlement of electronic money, the banking teller terminals 12 have associated IC card reader/writer units 11 and the auto-teller machine 14 has a built-in IC card reader/writer, and these terminals and machine are connected with a value box 15 by way of an electronic money transaction control terminal 16.

The bank computing center 5 includes a host accounting system 51 and external accounting system 52, which includes an external system control terminal 53, relay computer 17 and value box 15.

The retail store system 2, with its POS terminals being generally connected to a center facility 24 through an internal communication line 13 by way of a store controller 23, is further provided with IC card reader/writer units 11 attached to a POS terminals 22 or provided with electronic money POS terminals 21 for the monetary settlement of electronic money. The center facility 24 includes a value control/management system 25, work station 26 and value box 15.

The user system 3 which mainly supports individual users can be as simple as only an electronic wallet 31 with the ability of displaying the balance of electronic money stored in the IC card and possibly with an additional calculator function. In addition, the user's personal computer 32 has the provision of a PC-type IC card reader/writer 33 for the monetary settlement of electronic money and the ability of linkage to the public telephone line 7. The user can also use the IC card telephone 34 which can handle IC cards.

The personal computer 32 and IC card telephone 34 of the individual user system 3 have the provision of two IC card reader/writers so as to perform the electronic money transfer between two pieces of IC cards, and it is possible, for example, to transfer electronic money from the husband's IC card to the wife's IC card.

The vending machine system 4 includes a vending machine 42 having a built-in IC card reader/writer 41.

Next, the method of use of the electronic money transaction system arranged as described above to which the inventive electronic wallet is applied will be explained.

The electronic money originator 6 distributes IC cards 10 to banks, retail stores, vending machines and individual users that are members of the system. The bank receives electronic money in exchange for currency, and stores the electronic money in the value box 15 in the external accounting system 52. The value box 15 stores many IC cards, to which electronic money received from the electronic money originator 6 is distributed and stored. Electronic money stored in the IC cards in the value box 15 of the external accounting system 52 is distributed to IC cards in the value box 15 of the bank branch system 1.

Each individual member as a user of the electronic money transaction system possesses a distributed IC card 10. The user draws one's deposit of bank account in the form of electronic money and stores it in one's IC card 10 by using the banking teller terminals 12 or auto-teller machine 14 in the bank branch system 1. The user connects one's personal computer 32 equipped with the PC-type IC card reader/writer 33 or one's IC card telephone 34 to the bank branch system 1 through the public telephone line 7 and can convert the deposit account money into electronic money and store it in one's IC card 10.

At the drawing of electronic money, the user's IC card is linked based on its communication function to a specific IC card in the value box 15 of the bank branch system 1 by way of the banking teller terminal 12, auto-teller machine 14, personal computer 32, or IC card telephone 34. Electronic money stored in the IC card 10 of the value box 15 of the bank branch system 1 is transferred and stored in the user's IC card 10 under control of the transaction management terminal 16. At the same time, the balance of electronic money stored in the IC card in the value box 15 of the bank branch system 1 is subtracted by the amount of electronic money transferred to the user's IC card 10. The drawing of deposits of bank accounts of individuals is the same as the convention.

It is also possible for the user to convert currency into electronic money and store it in one's IC card at the bank or IC card originator, instead of drawing the deposit of bank account explained above.

Electronic money stored in the user's IC card can be transferred back to the IC card in the value box 15 of the bank branch system 1 by way of the banking teller terminal 12, auto-teller machine 14 or personal computer 32, and deposited in the user's bank account.

The user having electronic money stored in one's IC card 10 as explained above can use the IC card to buy goods and services in retail stores and agents that are members of the system.

Specifically, for example, the IC card user who intends to buy goods brings the things to the POS terminal counter in the retail store. The clerk operates the POS terminal 21 or 22 to read the barcode label of each thing thereby to enter its price and total the prices of all things, and charges the total price to the customer.

The customer who intends to pay for the goods with the IC card puts the card into the card inlet of the electronic money POS terminal 12 or the IC card reader/writer unit 11 attached to the usual POS terminal 22.

The user's IC card is linked to the relevant IC card in the value box 15 in the center facility 24 of the retail store by way of the store controller 23 and work station 26 over the internal communication line 13. Electronic money in the user's IC card is transferred to the IC card in the value box 15 of the center facility 24, and the POS terminal issues a receipt to complete the transaction process. Electronic money in the user's IC card is subtracted by the amount of payment, and it is added to electronic money in the IC card of the retail store.

Different from the foregoing case of a retail store having a number of POS terminals and a value box in the center facility 24 for storing many IC cards, a small retail shop having only a cash register has the installation of an IC card reader/writer and has a shop's IC card for the cash register, thereby allowing customers to pay with their IC cards through the linkage to the shop's IC card by the IC card reader/writer attached to the cash register. Electronic money stored in the shop's IC card can be deposited to the bank account or can also be cashed at the bank.

As a manner of organizing a retail store system having POS terminals, these terminals are provided with individual IC cards so that transactions with customer's IC cards are carried out temporarily based on the IC cards of POS terminals, and the contents of IC cards are transferred from the POS terminals to the IC cards in the value box 15 of the center facility 24 afterward when necessary.

The vending machine 42 included in the electronic money transaction system is provided with the IC card reader/writer 41 built in the machine and its own IC card so that transaction is carried out with a customer's IC card coupled to the IC card reader/writer 41 by the customer.

Next, an embodiment of the electronic wallet used in the foregoing electronic money transaction system will be explained with reference to FIGS. 2A and 2B, FIGS. 3A and 3B, and FIG. 4. In these figures, reference numeral 311 denotes a casing of the electronic wallet, 312 is a display window, 313a and 313b are IC card slots, 314 is a cross key, 315 is Function key, 316 is Enter key, 317 is a card cover, 318 is a circuit board, 319 is an electronic contact, 320 is a microprocessor for controlling electronic money, 321 is an application specific integrated circuit, and 322 is a timer. Remaining symbols are consistent with FIG. 1.

Figure 2A:
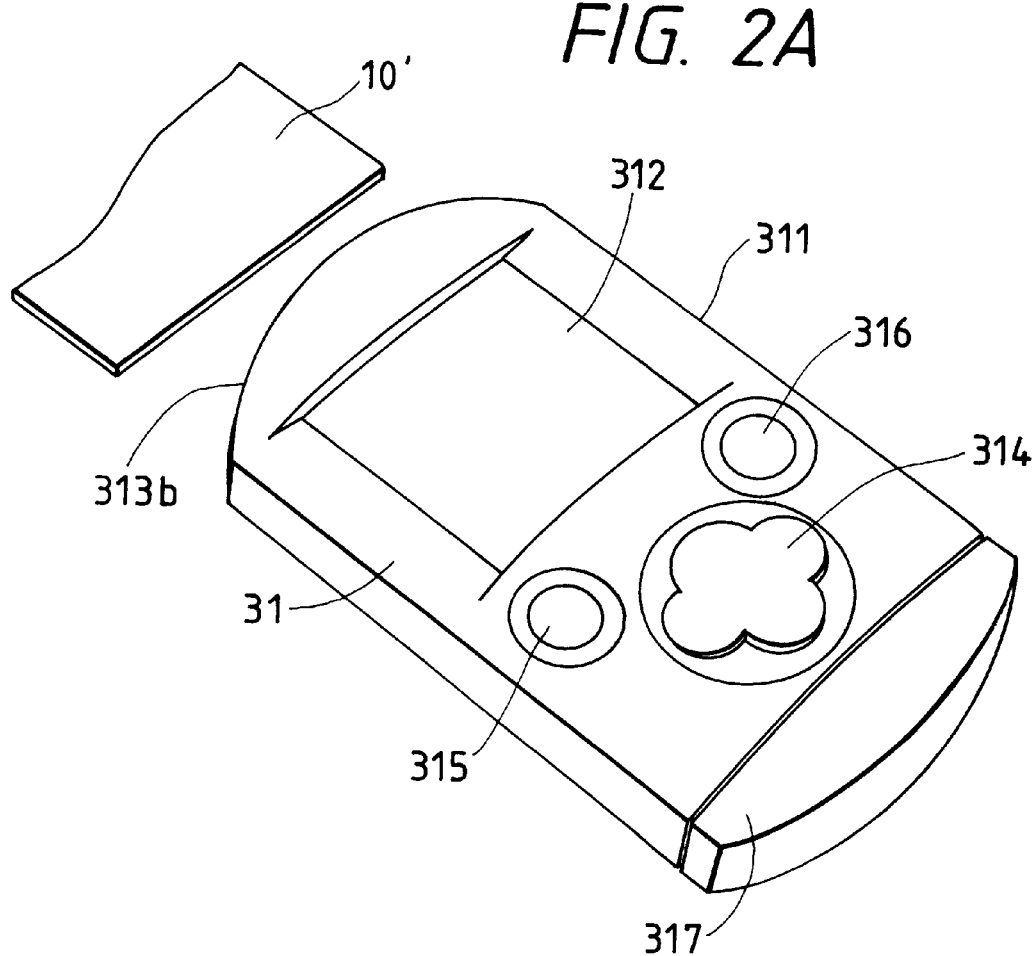
FIG. 2A is a perspective view of the electronic wallet based on an embodiment of this invention.
Figure 2B:
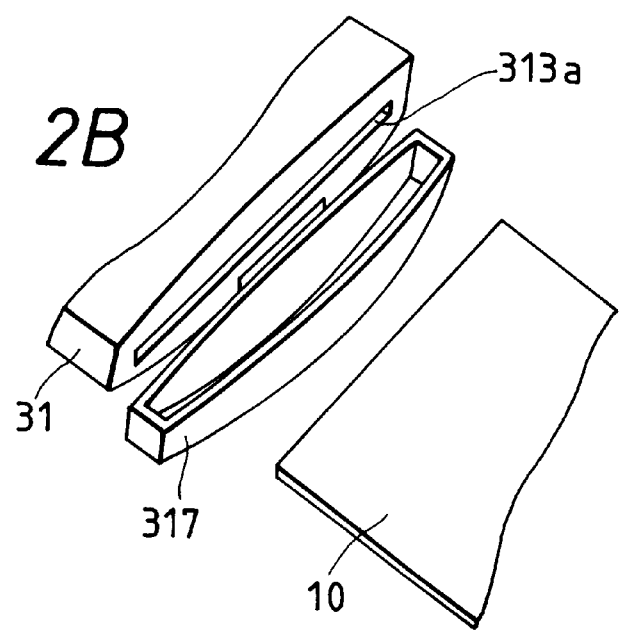
FIG. 2B is a perspective view of the electronic wallet shown in FIG. 2A, with the card cover being open.
Figure 3A:
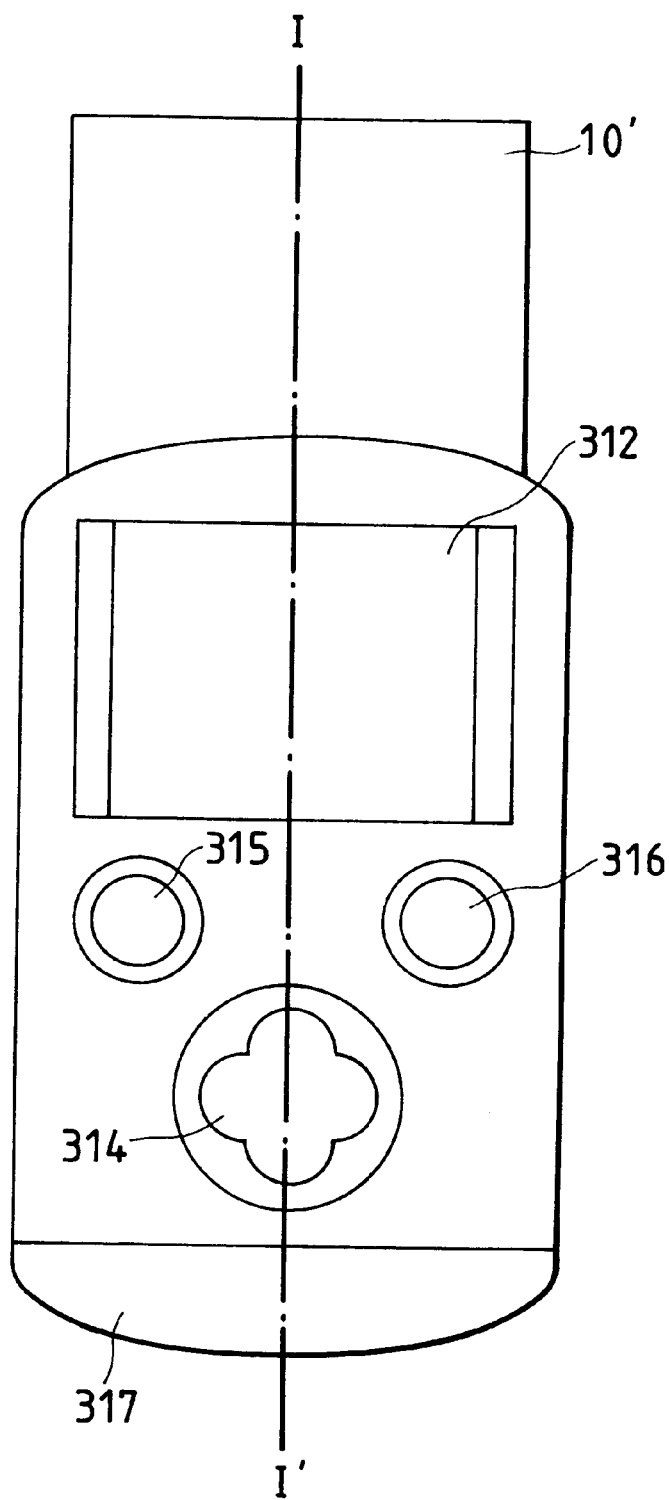
FIG. 3A is a top view of the electronic wallet shown in FIG. 2A.

The electronic wallet of this embodiment has a display window 312, e.g., liquid crystal device, and an operation board including a cross key 314, Function key 315 and Enter key 316, all laid out on the top of the casing 311, and IC card slots 313a and 313b, in which IC cards 10 and 10' are inserted, located at the lower side and upper side of the casing 311, as shown in FIG. 2A and FIG. 3A. The IC card 10, which is the user's own card and carried with the electronic wallet 31, is put into the lower card slot 313a and its entirety is accommodated in the casing 311. A card cover 317 which is hinged to the lower side edge of the casing 311 as shown in FIG. 2B protects the IC card 10 from extraneous dusts and moisture when the electronic wallet 31 is carried outdoors. A similar card cover may be fitted to the upper side of the casing 311. In addition, the casing 311 may be devised so that the IC card is ejected by the cover opening operation.

Figure 3B:
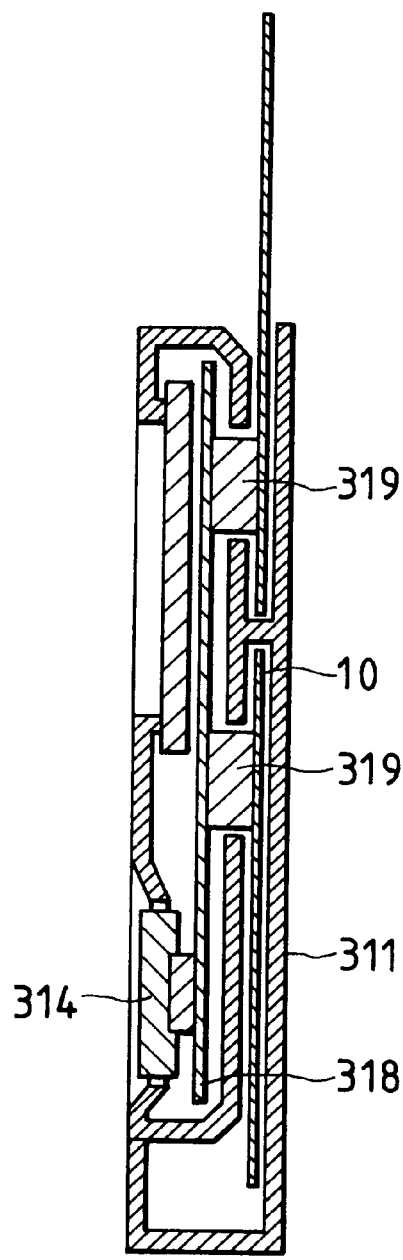
FIG. 3B is a cross-sectional diagram of the electronic wallet taken along the line I–I' of FIG. 3A.

The electronic wallet 31 incorporates a circuit board 318 of control functions, which will be explained later, and contacts 319 which connect electrically the two IC cards 10 and 10' in their inserted positions to the circuit board 318, as shown in FIG. 3B. The electronic wallet 31 does not have a power switch, and it is turned on when any key of the operation board is operated, as will be explained in detail later. In order to prevent the unintentional power-on event of the electronic wallet 31 when it is carried by the user, the cross key 314, Function key 315 and Enter key 316 have their key tops recessed below the top surface of the casing 311.

Figure 4:
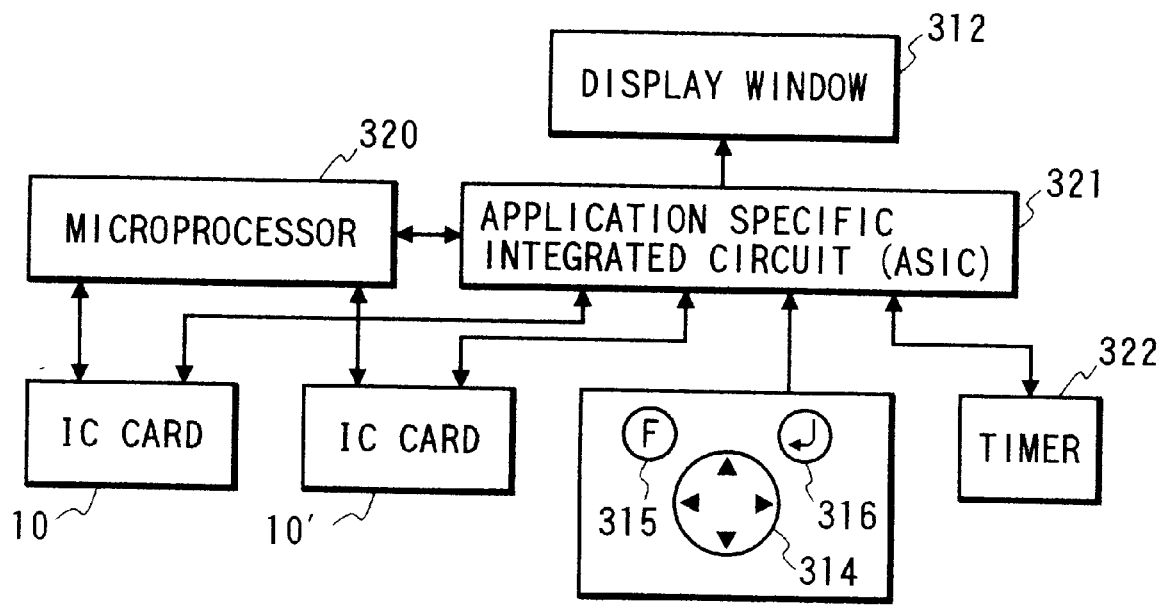
FIG. 4 is a functional block diagram of the electronic wallet.

Packaged on the circuit board 318 in the electronic wallet 31 are a microprocessor 320 which implements the electronic money transaction process for the IC cards 10 and 10', an application specific integrated circuit 321 which controls the overall electronic wallet, and a timer 322 which operates to turn off power on expiration of a prescribed time length (several seconds) after the last key operation on the operation board, as shown by the functional block diagram of FIG. 4.

Next, the general usage of the electronic wallet 31 will be briefed prior to the detailed explanation of the operation.

The electronic wallet 31 is carried by the user, with the user's own IC card 10 being held in it. At the time of payment for shopping, for example, the user takes out the electronic wallet 31 and pushes any key on the operation board to turn on power. Upon confirming the balance of electronic money of the IC card 10 displayed in the display window 312, the user enters the password number thereby to unlock the IC card 10. The user pulls out the IC card 10 from the electronic wallet 31 and puts it into the IC card transaction terminal of the store, and carries out the payment in terms of electronic money as explained in connection with FIG. 1.

In another case, the user who intends to transfer electronic money between one's own IC card 10 and other IC card 10' of one's child, for example, puts the other IC card 10' into the card slot 313b of the electronic wallet 31, and operates the keys by following the prompt indicated in the display window 312.

Next, various operational manners of the electronic wallet of this embodiment will be explained with reference to FIG. 5 and FIG. 6.

Figure 5:
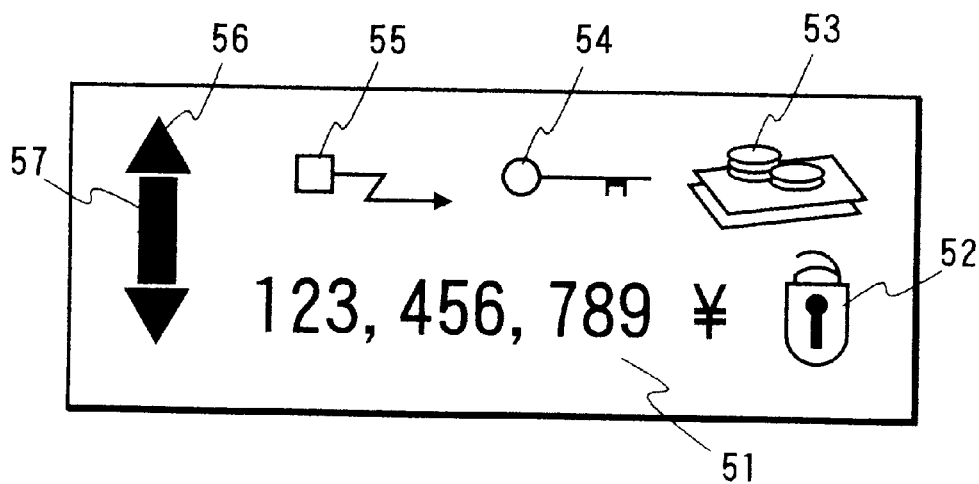
FIG. 5 is a diagram used to explain various icons displayed in the display window.

In FIG. 5, the display window 312 has a balance display area 51 and small areas for displaying an icon 52 indicative of the locked state, icon 53 of balance display mode, icon 54 of lock operation mode, icon 55 of money transfer mode, icons 56 of IC card designation, and icon 57 of transfer direction together with the icons 56. These icons are turned on depending on the selection of function with the Function key 315.

The function selecting operation will be explained with reference to the flowchart of FIG. 6.

(1) The electronic wallet 31 is turned on when any key of the operation board is pushed or when other IC card is inserted, and it enters the home-position state, i.e., the balance display mode for the IC card 10 held in the lower section of the wallet. In this state, the icon 52 of locked state, icon 53 of balance display mode and icon 56 pointing the lower IC card are on, and the balance of electronic money stored in the IC card 10 is displayed:(step 601).

(2) The user pushes the Function key 315 in the state of step 601, with other IC card 10' being present in the upper card slot 313b, then the process enters the balance display mode for the upper IC card 10' and displays the balance of electronic money stored in it:(step 602).

(3) The user pushes the Function key 315 in the state of step 602 or in the state of step 601, with other IC card 10' being absent in the upper card slot 313b, then the process enters the lock operation mode for the lower IC card 10, with the icon 54 being turned on. At the same time, the prompt of the entry of password number is indicated in the balance display area 51:(step 603). The operational manner of entering a password number in the lock operation mode will be explained later.

(4) The user pushes the Function key 315 in the state of step 603, with other IC card 10' being absent in the upper card slot 313b, then the process returns to the home-position state of step 601. Otherwise, if other IC card 10' is present in the upper card slot 313b, the process enters the lock operation mode for the upper IC card 10':(step 604).

(5) The user pushes the Function key 315 in the state of step 604, then the process enters the mode of money transfer from the lower IC card 10 to the upper IC card 10', with the icon 55 of money transfer and icons 56 and 57 of transfer direction to the upper IC card 10' being turned on. At the same time, the prompt of the entry of an amount of money to be transferred is indicated in the balance display area 51: (step 605). The operational manner of entering an amount of money in the money transfer mode will be explained later.

(6) The user pushes the Function key 315 in the state of step 605, then the process enters the mode of money transfer from the upper IC card 10' to the lower IC card 10, with the icons 56 and 57 of transfer direction to the lower IC card 10 being turned on. When the user further pushes Function key 315 in this state, the process returns to the home-position state of step 601:(step 606).

Figure 7:
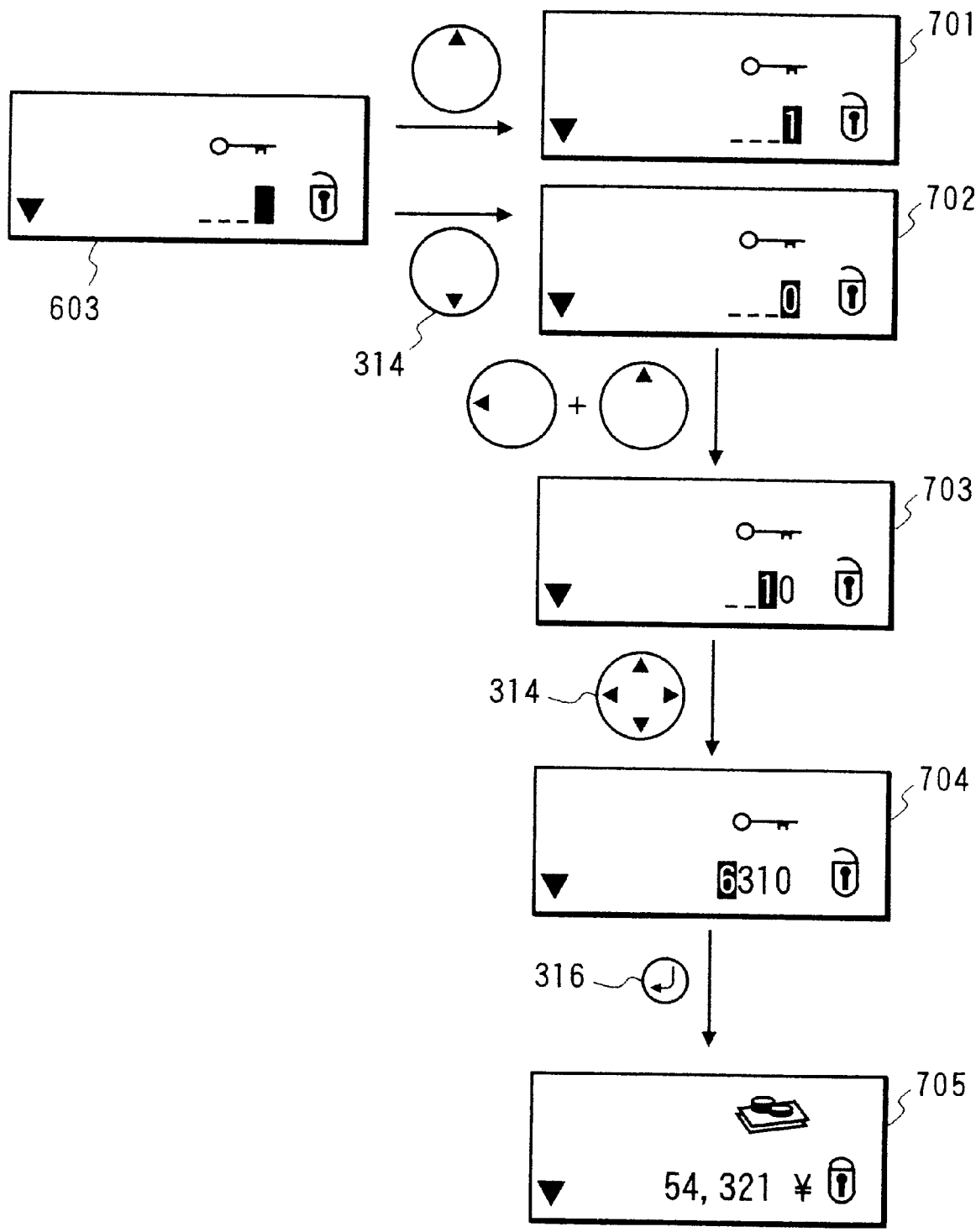
FIG. 7 is a flowchart used to explain the operation of entering a password number in lock operation mode.

The operational manner of entering a password number in the lock operation mode will be explained with reference to the flowchart of FIG. 7. The cross key 314 is mainly used for the entry of password number, and key operations to the upper, lower, right and left acting positions indicated by arrow heads on the key top will be called pushing of an up-key, down-key, right-key and left-key in the following explanation.

(1) Initially, the user selects the lock operation mode of step 603 in the operational manner explained in connection with FIG. 6. The area for the entry of password number (balance display area 51) has its cursor located initially at the lowest digit position as shown in FIG. 7. The user pushes the up-key or down-key which increases or decreases the number of the digit by one. Specifically, pushing the up-key once displays "1" as an inverted image (bright image on the dark background), and pushing the down-key subsequently turns the display to "0". The inverted image indicates the "unfixed" state, allowing the alteration of input with the up-key or down-key:(steps 701 and 702).

(2) In case of the lowest digit position of a password is "0", the user pushes the left-key, and the cursor moves to the next higher digit position, with the input number of the preceding digit being fixed and displayed as a normal image. The user keys in a number for this digit in the same manner, and repeats the key-in operation to put in all digits of the intended password number:(steps 703 and 704).

(3) upon confirming the correct input password number displayed, the user pushes the Enter key 316. Then, the process enters the balance display mode, with the IC card being unlocked in case it has been locked or locked in case it has been unlocked:(step 705).

Instead of the foregoing procedure of entering the password number required in both of unlocking and locking the IC card, it may be designed to request the user to enter the password number only for unlocking the card and allow the user to lock the card by simply pushing the Enter key 316 at first in the lock operation mode. Moreover, instead of the foregoing procedure of entering the password number in the ascending order of digits, it may be designed to initialize the cursor to the highest digit position and allow the user to enter the password number in the descending order of digits while shifting the digit position downward by pushing the right-key. Moreover, the key-in procedure may be designed to input "0" automatically at the digit of cursor position in response to the digit shift operation with the right-key or left-key. Moreover, the key-in procedure may be designed to bring the fixed input number of a digit back to the "unfixed" state of inverted image in response to the repositioning of the cursor to that digit so that the user can alter the input of the digit with the up-key or down-key.

Figure 8:
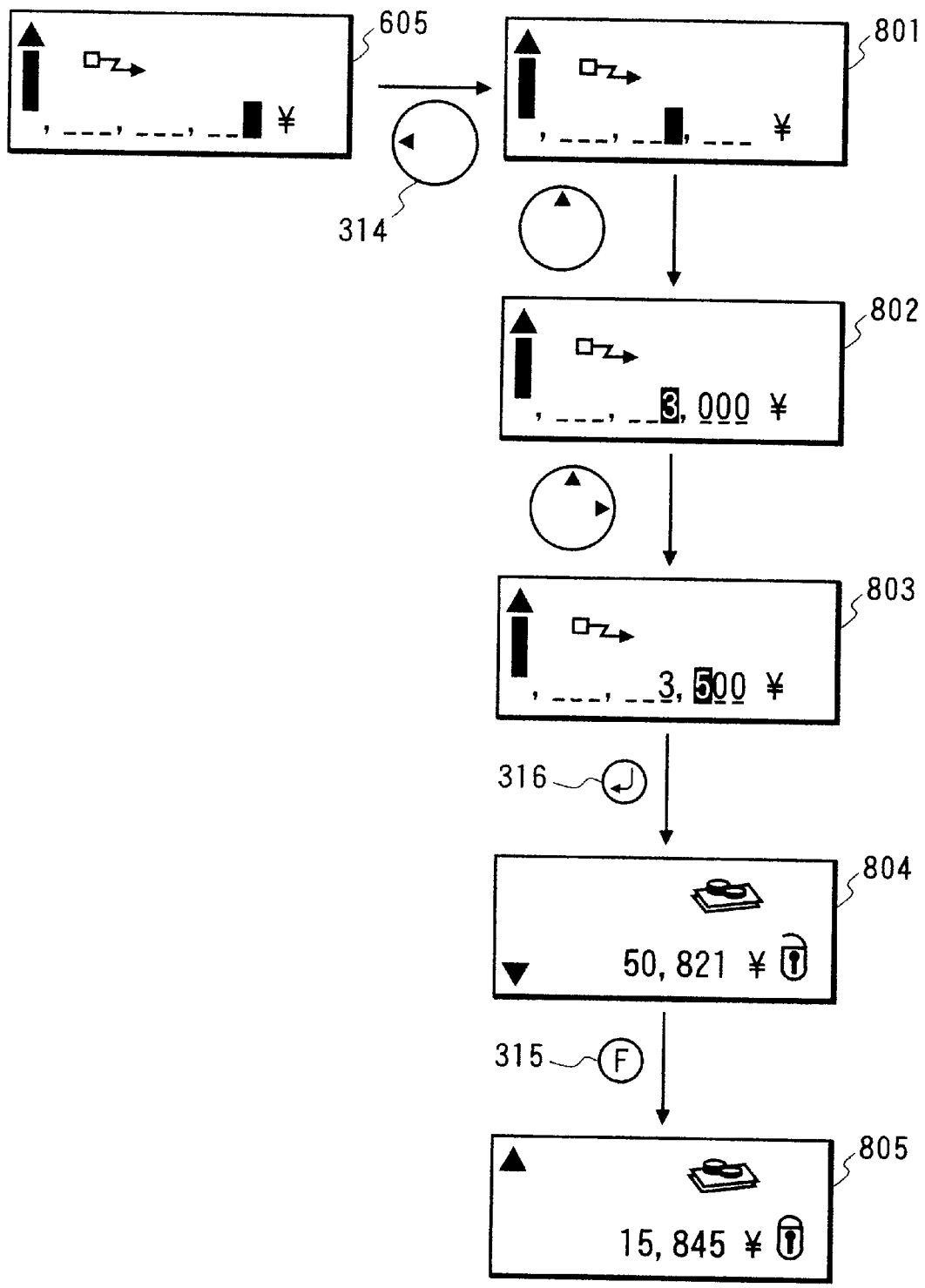
FIG. 8 is a flowchart used to explain the operation of entering an amount of money transfer in transfer mode.

Next, the operational manner of entering an amount of money in the money transfer mode will be explained with reference to the flowchart of FIG. 8. The cross key 314 is used for this operation in the same manner as in the entry of password number.

Figure 6:
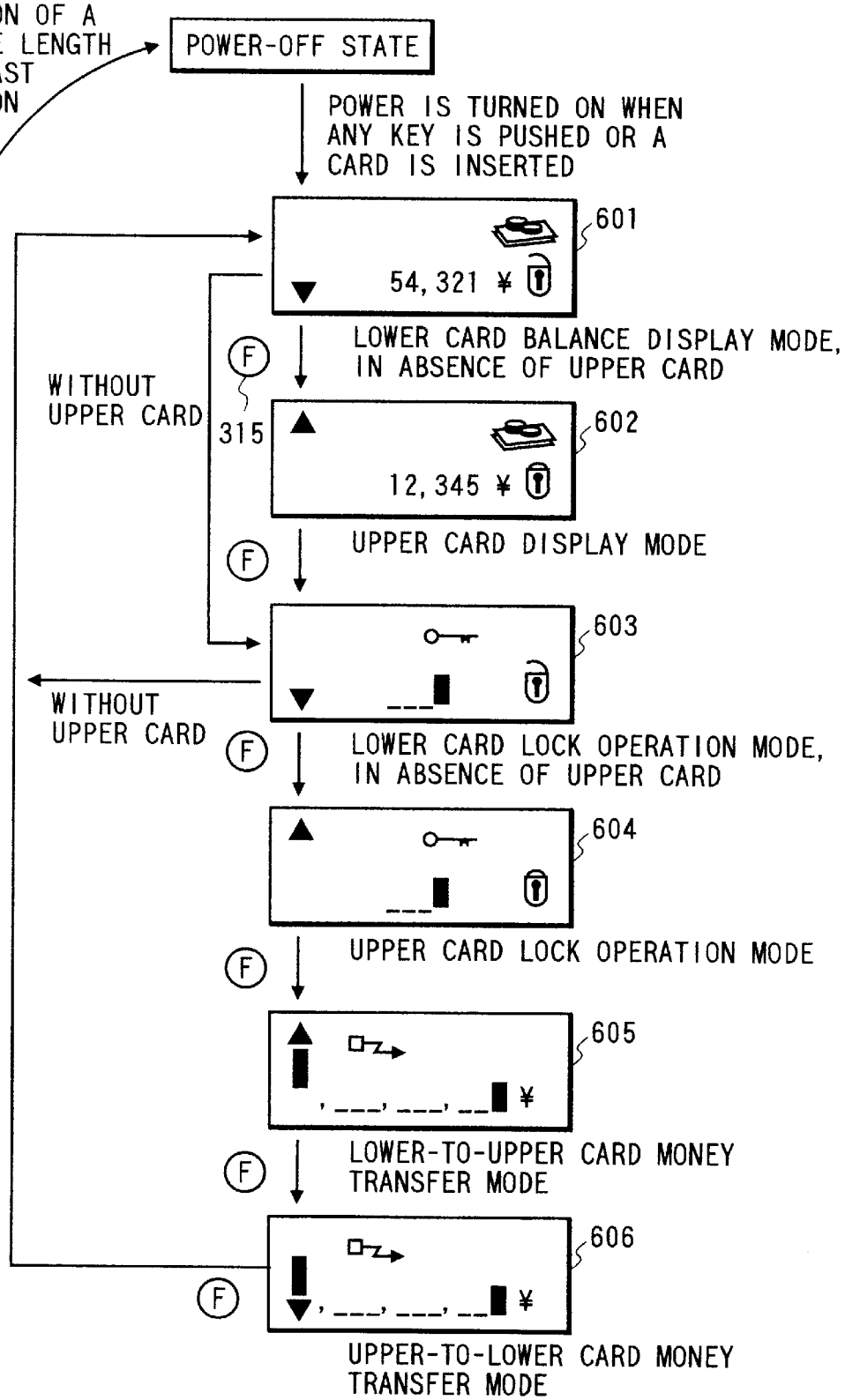
FIG. 6 is a flowchart used to explain the function selecting operation.

(1) Initially, the user selects the mode of money transfer from the lower IC card 10 to the upper IC card 10' as shown by step 605 in the flowchart of FIG. 6. The cursor is initially at the lowest digit position of the amount entry area (balance display area 51). The user pushes the left-key a certain number of times to move the cursor to the highest digit of the amount of money to be transferred:(step 801).

(2) The user keys in the amount of money transfer by using the up-key, down-key and right-key in the same manner as the entry of password number:(steps 802 and 803).

(3) Upon confirming the correct amount of money displayed, the user pushes the Enter key 316. Then, the process carries out the money transfer between the two IC cards 10 and 10', and thereafter enters the balance display mode to display the balance of the lower card 10 after money transfer: (step 804).

(4) If the user pushes the Function key 315 in this state, the process enters the balance display mode to display the balance of the upper card 10' after money transfer.

Besides the manner of use of the cross key 314 for increasing and decreasing the input number of a digit and shifting the digit position as described above, the key has several other conceivable manners of use, as will be explained in the following.

FIGS. 9A through 9E show various manners of use of the cross key for the entry of an amount of money.

Figure 9A:
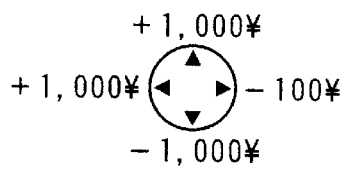
FIGS. 9A through 9E are diagrams explaining various examples of the use of the cross key for the entry of an amount of money.

Shown in FIG. 9A is the assignment of the up, down, left and right-keys of the cross key to unit amounts +¥1000,-1000, +¥100 and -¥100, respectively, so that the input amount is added or subtracted by these amounts by each key operation.

Figure 9B:
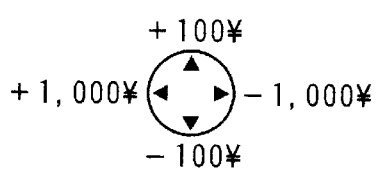

Shown in FIG. 9B is derived from the previous example of FIG. 9A, with the keys having their functions exchanged between ¥1000 and ¥100.

Figure 9C:
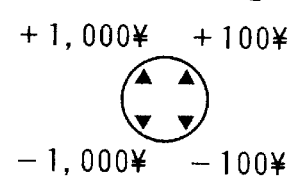

Shown in FIG. 9C is the layout of key positions of the cross key, with its up-left, down-left, up-right and down-right keys being assigned to unit amounts +¥1000,-¥1000, +¥100 and -¥100, respectively. This key layout, with the upper keys being to add and the lower keys being to subtract the input amount, allows the user to key in an amount of money more naturally.

Figure 9D:
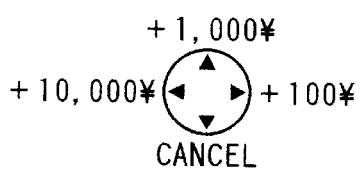

Shown in FIG. 9D is the assignment of the left, up and right-keys of the cross key to unit amounts +¥10000, +¥1000 and +¥100, respectively, with the down-key being assigned to the function of Cancel key, instead of providing subtracting keys. The Cancel key is used to erase the input amount and key in a correct amount from the beginning at the occurrence of input error during the adding input operation. Shown in FIG. 9E is similar to the example of FIG. 9D, and is the assignment of the left, up and right-keys to +¥1000, +¥100 and +¥10, respectively, with the down-key being assigned to the function of Cancel key.

Figure 9E:
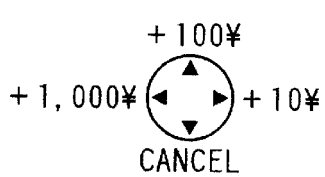

The examples of FIGS. 9D and 9E are advantageous in that amounts of money of wide range can be entered in less key strokes as compared with the examples of FIGS. 9A–9C.

FIGS. 10A through 10D show various manners of use of the cross key which is given the functions of Execute key and Function key, as well as the function of keying in an amount of money.

Figure 10A:
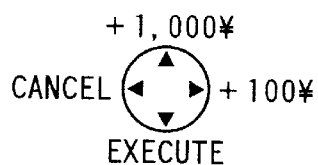
FIGS. 10A through 10D are diagrams explaining various examples of the use of the cross key, with a function of amount input and functions of Enter key and Function key being assigned.

Shown in FIG. 10A is the assignment of the up and right-keys of the cross key to unit amounts +¥1000 and +¥100, with the left and down-keys being assigned to the functions of Cancel key and Execute key. The adding keys and Cancel key have the same functions as those of the preceding example of FIG. 9D, and the Execute key can substitute for the Enter key 316.

Figure 10B:
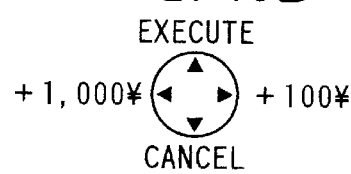
Figure 10C:
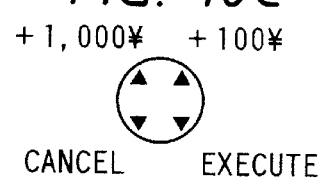

Shown in FIG. 10B is derived from the previous example of FIG. 10A, with the Cancel and Execute keys having their positions exchanged. Shown in FIG. 10C is for the cross key having the same structure as that of the preceding example of FIG. 9C, with the down-left and down-right keys being assigned to Cancel key and Execute key. These keys are used in the same manner as the examples of FIGS. 10A and 10B.

The examples of FIGS. 10A–10C are intended to make the cross key substitute for the Enter key 316, enabling the operation board of the electronic wallet to be as simple as having only the cross key and Function key.

Figure 10D:
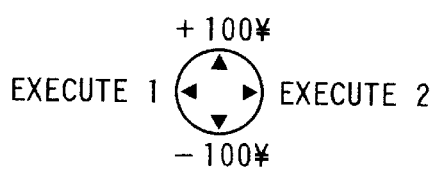

Shown in FIG. 10D is the assignment of the left and right-keys to two Execute keys, with the left and right Execute keys functioning as Function key and Enter key, respectively, f or example. The up and down-keys are assigned to unit amounts +¥100 and -¥100. The key-in procedure is designed such that pushing the +100¥ key (or -100¥ key) continuously adds (or subtracts) ¥100 successively and further pushing the key continuously adds (or subtracts) ¥1000 successively, for example, enabling the user to key in a large amount of money easily.

The example of FIG. 10D is intended to make the cross key substitute for the Enter key 316 and Function key 315, enabling the operation board of the electronic wallet to be as simple as having only the cross key.

Next, operational manners of entering an amount of money by use of the foregoing cross key will be explained.

Figure 11:
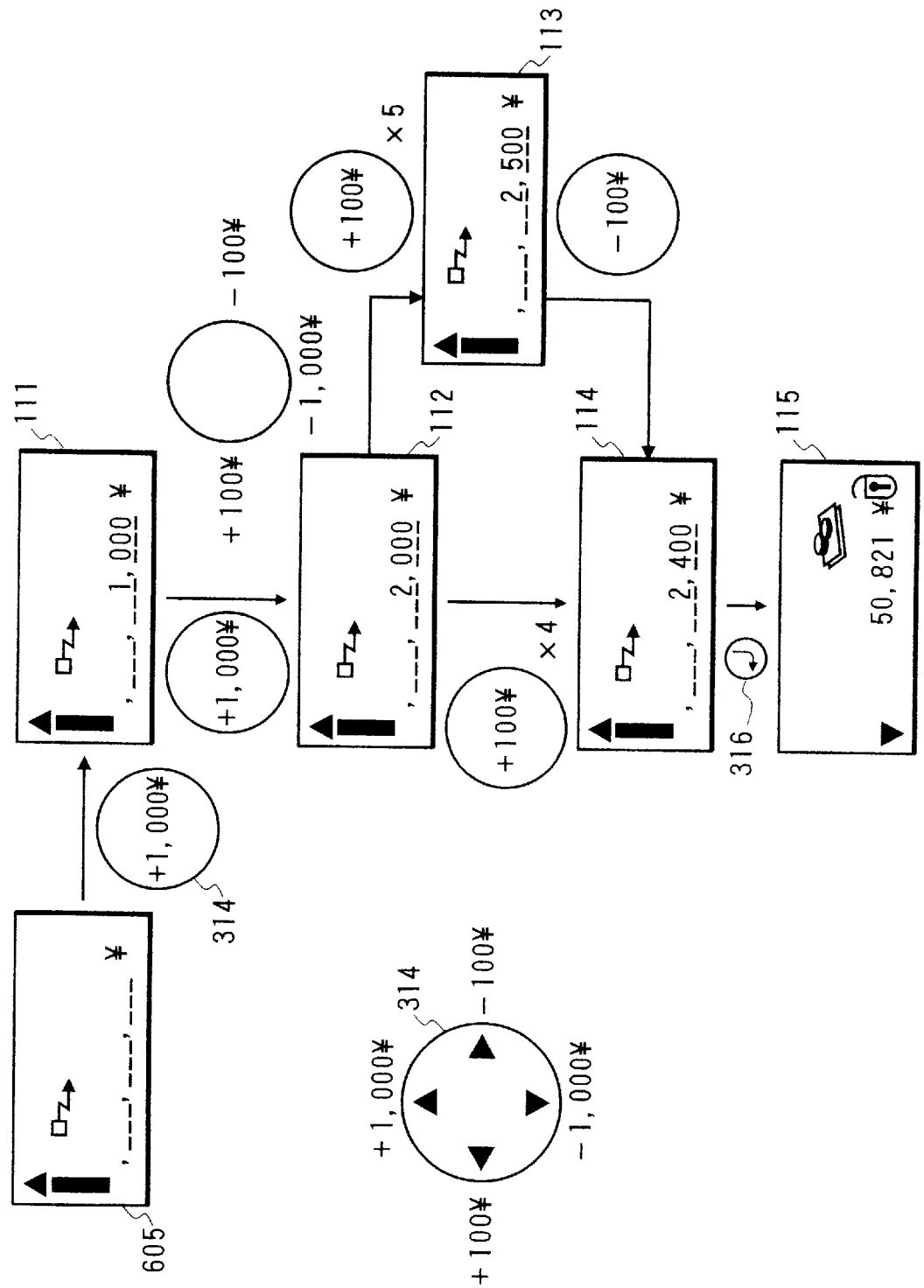
FIG. 11 is a flowchart used to explain the amount input operation with the cross key shown in FIG. 9A.

As an example of input operation in money transfer mode, transfer of ¥2400 by use of the cross key shown in FIG. 9A will be explained in connection with the flowchart of FIG. 11.

(1) Initially, the user selects the mode of money transfer from the lower IC card 10 to the upper IC card 10' as shown by step 605 in the flowchart of FIG. 6. In this state, the user pushes the up-key (+1000¥ key) of the cross key once, and ¥1000 is input, with "1000¥" being displayed in the amount display area:(step 111). Another pushing of the key adds ¥1000 to the input amount, resulting in a display "2000¥": (step 112).

(2) The user who intends to add ¥400 pushes the left-key (+100¥ key) four times, resulting in a display "2400¥":(step 114).

(3) In case the user pushes the +100¥ key five times in excess, and is aware of the error by viewing a display "2500¥", the user pushes the right-key (-100¥ key):(step 113). Then, the ¥100 is subtracted from the input amount, resulting in a display "2400¥":(step 114).

(4) Upon confirming the correct input amount displayed, the user pushes the Enter key 316. Then, the process carries out the money transfer process, and thereafter enters the balance display mode to terminate:(step 115).

Figure 12:
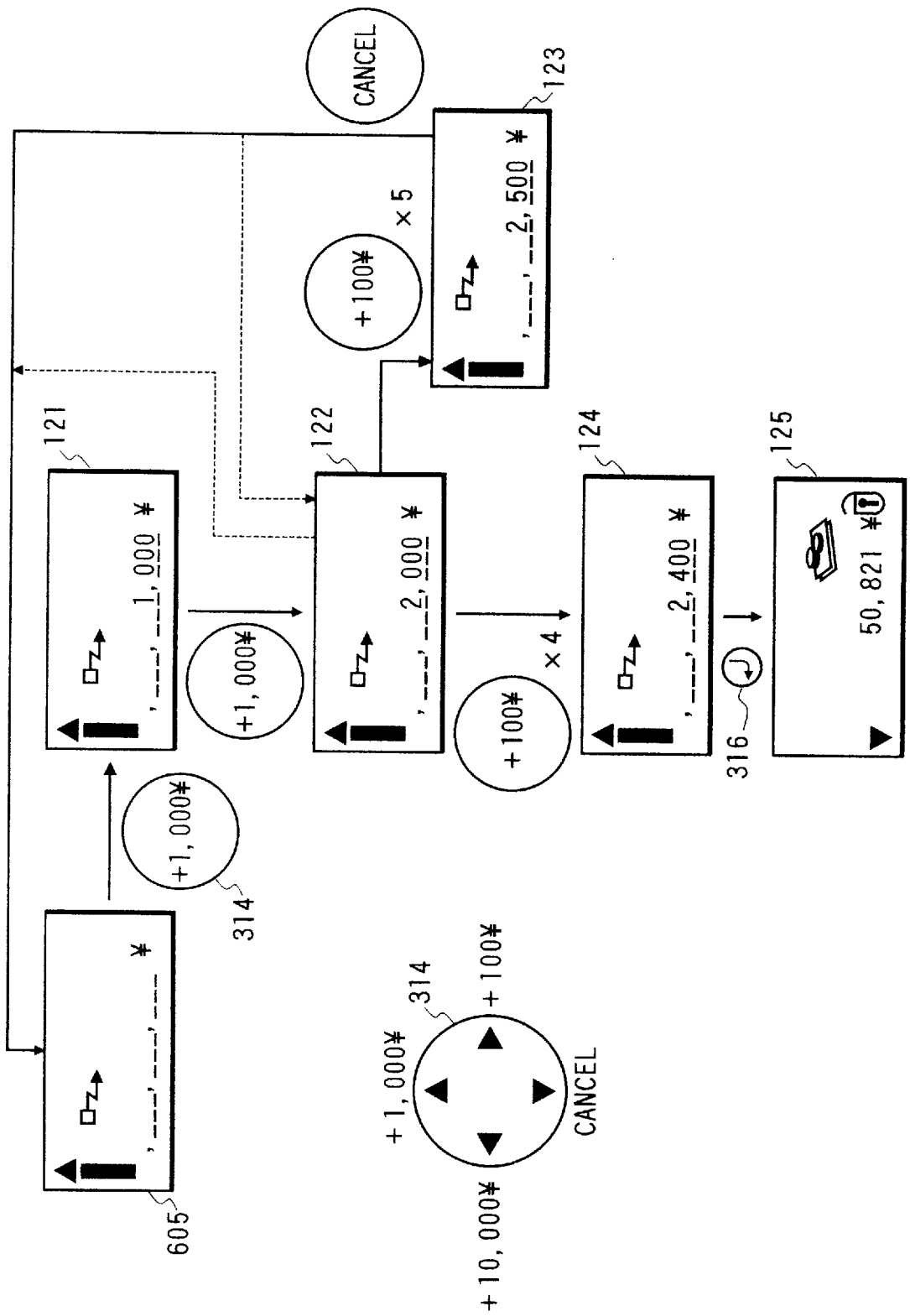
FIG. 12 is a flowchart used to explain the amount input operation with the cross key shown in FIG. 9D.

Another example of input operation for transferring ¥2400 by use of the cross key shown in FIG. 9D will be explained in connection with the flowchart of FIG. 12.

(1) Initially, the user selects the mode of money transfer from the lower IC card 10 to the upper IC card 10' as shown by step 605 in the flowchart of FIG. 6. In this state, the user pushes the up-key (+1000¥ key) of the cross key once, and ¥1000 is input, with "1000¥" being displayed in the amount display area:(step 121). Another pushing of the key adds ¥1000 to the input amount, resulting in a display "2000¥": (step 122).

(2) The user who intends to add ¥400 pushes the right-key (+100¥ key) four times, resulting in a display "2400¥":(step 124).

(3) In case the user pushes the +100¥ key five times in excess, and is aware of the error by viewing a display "2500¥", the user pushes the Cancel key:(step 123). Then, the process returns to the beginning of money transfer mode at step 605, allowing the user to key in the amount again: (step 605).

(4) Upon confirming the correct input amount displayed, the user pushes the Enter key 316. Then, the process carries out the money transfer process, and thereafter enters the balance display mode to terminate:(step 125).

As a modified procedure after the Cancel key is pushed in step 123, the process may be designed to return to step 122 so that the user can resume the input operation with the +100¥ key. Furthermore, the process may be designed to return from step 122 to step 605 in response to the operation of the Cancel key at step 122 so as to cancel the erroneous input with the +1000¥ key.

Although the foregoing examples explained in connection with FIGS. 9A through 12 deal with limited kinds of money, with ¥10 and ¥1 being excluded, it does not matter since electronic money is supposedly transferred mainly within a family or the like. In addition, the electronic wallet of this embodiment is intended mainly for children, and therefore it does not need to deal with much larger unit amounts of money.

Although the cross key explained above is a device consisting of switches at four positions of a key, it may be made up of four independent keys in united arrangement.

Figure 13A:
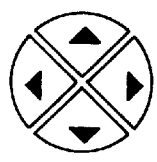
FIGS. 13A through 13C are diagrams showing examples of the cross key consisting of four independent keys.
Figure 13B:
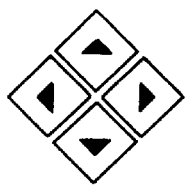
Figure 13C:
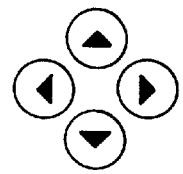

FIGS. 13A, 13B and 13C show examples of cross key made up of four independent keys. Shown in FIG. 13A is a set of four keys each shaped in a quarter circle arranged in circular configuration. Shown in FIG. 13B is a set of four small square keys arranged in square configuration. Shown in FIG. 13C is a set of four circular keys in cross configuration.

In place of the cross key, the inventive electronic wallet can employ other pointing device such as a joystick having equivalent functions.

Figure 14A:
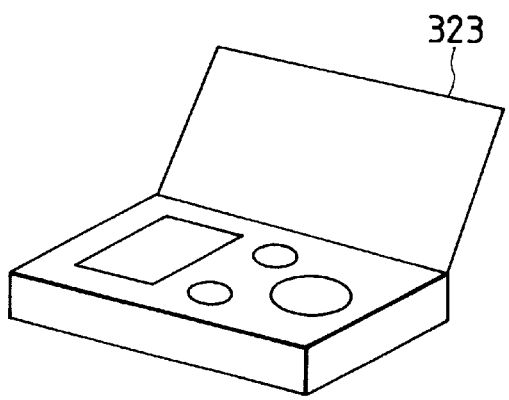
FIGS. 14A through 14C are simple perspective views showing different external structures of the inventive electronic wallet.
Figure 14B:
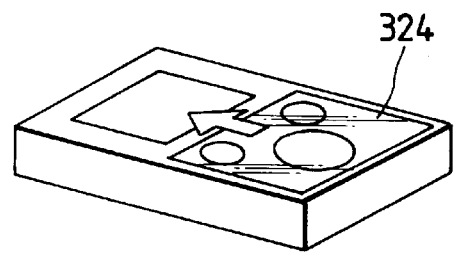
Figure 14C:
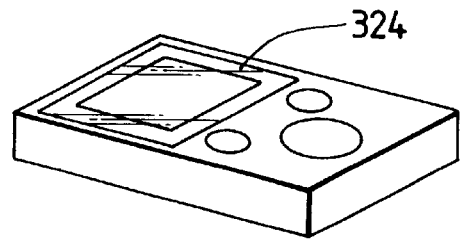

FIGS. 14A, 14B and 14C show in brief external views of electronic wallets based on other embodiments of this invention. In the figures, reference numeral 323 denotes a top cover and 324 is a transparent top cover.

Shown in FIG. 14A is an electronic wallet derived from the one explained in connection with FIGS. 2A and 2B and FIGS. 3A and 3B, with a top cover 323 being hinged to it. This structure ensures the prevention of unintentional power-on event caused by an accidental key operation when it is carried in the user's pocket or the like and also the protection of the display window and operation board from dusts and moisture.

Shown in FIG. 14B and 14C is an electronic wallet derived from the one explained in connection with FIGS. 2A and 2B and FIGS. 3A and 3B, with a transparent top cover 324 being fitted slideably over the operation board. This structure ensures the prevention of unintentional power-on event caused by an accidental key operation when it is carried in the user's pocket or the like, and it also allows the user to make access to keys by simply sliding the top cover 324 to the display window much easier than the structure with the hinged top cover 323 of FIG. 14A.

The electronic wallet of the foregoing embodiments of this invention reduces the number of keys and operation board area drastically without sacrificing the operationability as compared with the employment of a ten-key set, whereby the latitude of design is widened and the manufacturing cost is reduced. The electronic wallet takes up a smaller operation board area where even larger keys can be laid out, while allotting a larger area for the display window, whereby even a weak-sighted person can easily view a display and operate the keys.

The electronic wallet of the foregoing embodiments having a reduced number of key tops can be used easily by people such as children and elders who are not familiar with advanced electronic appliances. The electronic wallet of the foregoing embodiments can be operated at a smaller risk of exposure of the input amount and password number in terms of key operation to other person as compared with the case of employing a ten-key set.

According to the present invention, as described above, it becomes possible for the electronic wallet to reduce the number of keys and operation board area drastically without sacrificing the operability and have a large display window, whereby the user can enter and view a password number, amount of money, and the like easily.

While the present invention has been described for the preferred embodiments, the invention is not confined to these embodiments, but changes and modifications can be made obviously without departing from the essential spirit of the invention.

What is claimed is:

1. An electronic wallet having an operation board and display window, with an IC card which can store electronic money being held in said wallet, said operation board including a cross key which consists of four keys with four acting positions which can specify four operational functions, wherein said cross key has at least a function of entering a numeral and a function of selecting its numeral input position.

2. An electronic wallet according to claim 1, wherein said operation board further includes Function key and Enter key.

3. An electronic wallet having an operation board and display window, with an IC card which can store electronic money being held in said wallet, said operation board including a cross key which consists of four keys with four acting positions which can specify four operational functions, wherein said cross key has functions of additive input and subtractive input of money at every unit amount of money.

4. An electronic wallet having an operation board and display window, with an IC card which can store electronic money being held in said wallet, said operation board including a cross key which consists of four keys with four acting positions which can specify four operational functions, and said wallet further including a transparent top cover which is adapted to cover said operation board and slide on the casing toward said display window.

5. A method of operation of an electronic wallet which has a room for holding one IC card which can store electronic money, a card inlet for putting in other IC card which can store electronic money, an operation board including a cross key consisting of four keys in united arrangement with four acting positions which can specify four operational functions, Function key and Enter key, and a display window, and is used for the transaction of electronic money with said one IC card and the transfer of electronic money between said one IC card and said other IC card, said method including function selecting operations carried out after power is turned on and in a home-position state in which an icon indicative of balance display mode and icon indicative of locked state and the balance of electronic money of said one IC card are displayed in said display window, and comprising:

a first step of pushing the Function key thereby to display the balance of electronic money of said other IC card in said display window if said other IC card is present in said card inlet, or bring said electronic wallet to lock operation mode for said one IC card, with an icon of lock operation mode being turned on, if said other IC card is absent in said card inlet;

a second step of pushing the Function key thereby to bring said electronic wallet to lock operation mode for said other IC card, with the icon of lock operation mode being turned on, if said other IC card is present in said card inlet, or restore the home-position state of said electronic wallet if said other IC card is absent in said card inlet;

a third step of pushing the Function key in the lock operation mode established by said second step thereby to bring said electronic wallet to transfer mode of transferring electronic money from said one IC card to said other IC card, with an icon of the money transfer being turned on; and a fourth step of pushing the Function key thereby to bring said electronic wallet to transfer mode of transferring electronic money from said other IC card to said one IC card, with an icon of money transfer being turned on.

6. A method of operation of an electronic wallet according to claim 5, wherein the lock operation mode of said first step or second step is an operational mode which enables the locking operation or unlocking operation of the IC card, and wherein said cross key consists of keys of a first through fourth acting positions and is used to key in numerals of a password number at digit positions pointed by a cursor of a balance display area of said display window, and wherein said method includes at least:

a numeral input step of pushing the key of the first acting position which increases the number displayed at a digit position pointed by the cursor by one at each pushing operation or pushing the key of the second acting position which decreases the number at the digit position by one at each pushing operation, thereby putting in an intended numeral at the digit position;

a digit shift step of pushing the key of the third acting position or the key of the fourth acting position, thereby shifting the cursor to the upper or lower digit position; and a password number establishing step of pushing the Enter key after a complete password number has been input by repeating said numeral input step for all digits of password number, thereby establishing the input password number.

7. A method of operation of an electronic wallet according to claim 5, wherein the electronic money transfer mode of said third step or fourth step includes at least:

a digit position shift step of pushing the key of the third acting position or the key of the fourth acting position of said cross key a certain number of times, thereby moving the cursor to the highest digit position or lowest digit position of an amount display area of said display window;

a numeral input step of pushing the key of the first acting position which increases the number displayed by one at each pushing operation or pushing the key of the second acting position which decreases the number by one at each pushing operation, thereby putting in an intended number for an intended amount of money at a digit position pointed by the cursor;

a money transfer step of pushing the Enter key after the intended amount of money has been input by repeating said digit position shift step and numeral input step, thereby transferring the intended amount of electronic money between said one IC card and said other IC card and displaying the balance after money transfer of said one IC card; and a balance display step of pushing the Function key, thereby displaying the balance after money transfer of said other IC card.

8. An electronic wallet according to claim 3, wherein said cross key can be set plural kinds of unit amount of money.

9. An electronic wallet according to claim 3 or 8, wherein said operation board further includes a Function key and an Enter key.

10. An electronic wallet according to claim 3 or 8, wherein said cross key has a function of additive input of unit amounts of money and a function of the cancellation of input.

11. An electronic wallet according to claim 3 or 8, wherein said cross key has a function of additive input of unit amounts of money, a function of the cancellation of input and a function of Enter key.

12. An electronic wallet according to claim 3 or 8, wherein said cross key has a function of additive input of unit amounts of money, a function of Enter key and a function of Function key.

13. An electronic wallet having an operation board and display window, with an IC card which can store electronic money being held in said wallet, said operation board including a cross key which consists of four keys with four acting positions which can specify four operational functions, wherein power is turned on in response to the operation of any key on said operation board and power is turned off on expiration of a prescribed time length after the last key operation on said operation board.

14. An electronic wallet according to claim 1, further including a transparent top cover which is adapted to cover said operation board and slide on the casing toward said display window.

15. An electronic wallet having a room for holding one IC card which can store electronic money, a card inlet for putting in other IC card which can store electronic money, an operation board and a display window, said operation board including a cross key which consists of four keys with four acting positions which can specify four operation al functions, wherein said cross key has a function of entering an amount of the transfer of electronic money between said one IC card and said other IC card.

16. A method of operation of an electronic wallet which has a room for holding one IC card which can store electronic money, a card inlet for putting in other IC card which can store electronic money, an operation board and a display window, and said method comprising:

a step of putting said one IC card into said room;

a step of putting said other IC card into said inlet;

a step of determining a direction for the transfer of electronic money between said one IC card and said other IC card;

a step of entering amount of the transaction of electronic money between said one IC card and said other IC card; and wherein said amount of the transaction of electronic money can be entered by operating a cross key consisting of four keys with four acting positions which can specify four operational functions.

17. A method of operation of an electronic wallet according to claim 16, wherein said input operation of said amount of the transaction of electronic money comprising:

a step of determining a position of a cursor by operating a prescribed key of said cross key; and a step of entering a numeral by operating the other key of said cross key.

18. A method of operation of an electronic wallet according to claim 16, wherein said input operation of said amount of the transaction of electronic money is performed by operating said cross key which has functions of additive input and subtractive input of amounts of money at every unit amount of money.

19. A method of operation of an electronic wallet which has a room for holding one IC card which can store electronic money, a card inlet for putting in other IC card which can store electronic money, an operation board and a display window, and said method comprising;

a step of putting said one IC card into said room;

a step of displaying whether said one IC card has been locked or unlocked;

a step of entering a password number in case said one IC card has been locked; and wherein said password number can be entered by operating a cross key consisting of four keys with four acting positions which can specify four operational functions.

20. A method of operation of an electronic wallet according to claim 19, wherein said password number can be entered by carrying out steps comprising:

a step of determining a position of cursor by a prescribed key of said cross key; and a step of entering numeral by using the other key of said cross key.

* * * * *